March 8, 1927.  1,619,906
E. A. WHITE
MOTION STORAGE AND CONVEYING APPARATUS
Filed March 30, 1926  2 Sheets-Sheet 1
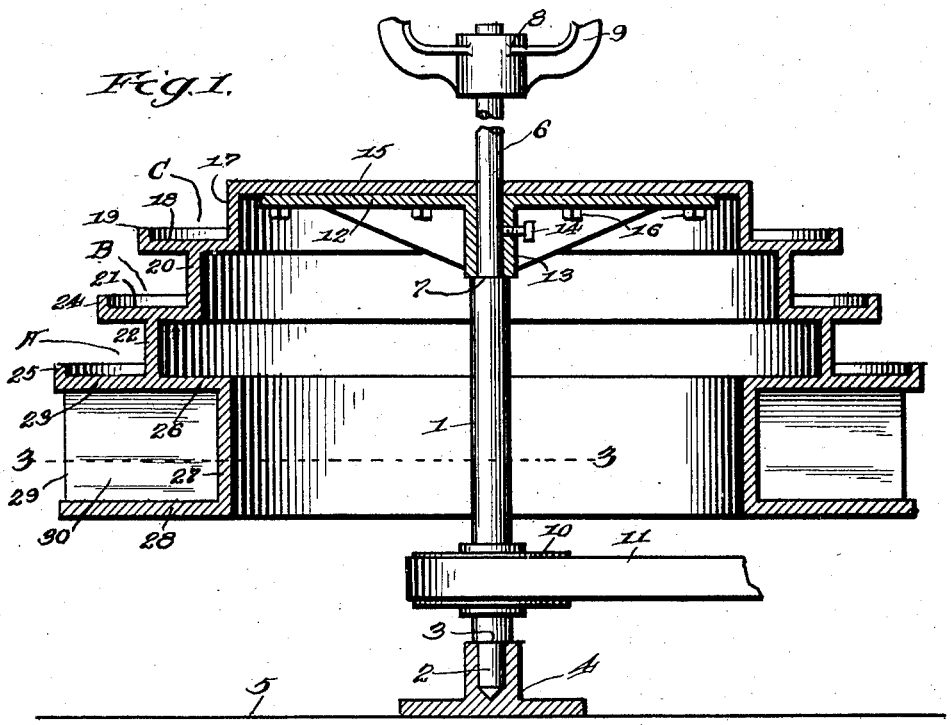
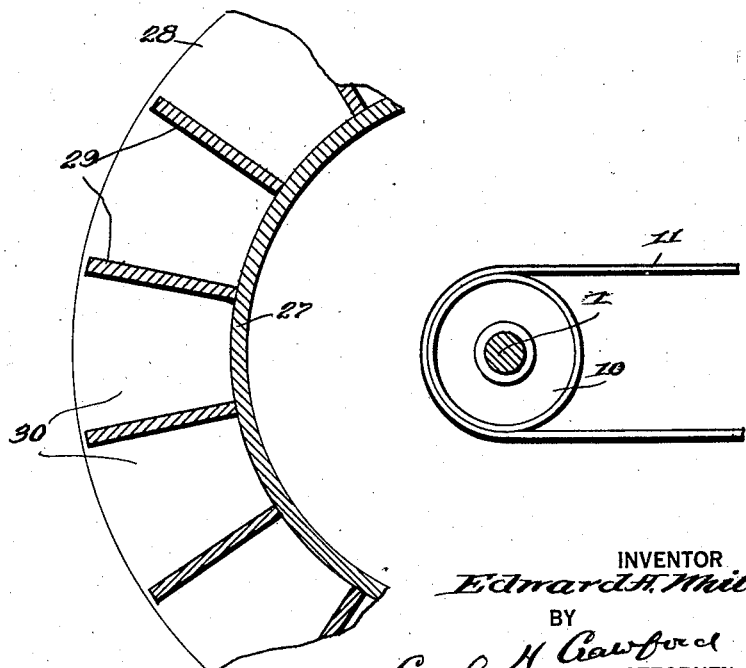
INVENTOR
Edward A. White
BY
Carl H. Crawford
ATTORNEY Patented Mar. 8, 1927.

1,619,906

UNITED STATES PATENT OFFICE.

EDWARD A. WHITE, OF LEWISTON, IDAHO.

MOTION STORAGE AND CONVEYING APPARATUS.

Application filed March 30, 1926. Serial No. 98,629.

The object of this invention is to provide a novel form of motion storage and conveyance mechanism for use especially in handling fruit.

One of the objects is to provide a capacity of storage in excess of the capacity of packers employed, whereby a number of grades of fruit can be deposited on the mechanism and maintained in motion without relative movement of the fruit with respect to said mechanism, whereby the fruit will not in any event ever be subjected to rubbing, burning, stem piercing or other damaging injury in the interval of movement between the sorter and the packer.

A further object of the invention is to convey the fruit from the sorter or point of deposition, to the packer or point of withdrawal of the fruit from the mechanism. In this connection, it is a further object of the invention to also provide conveying means whereby the sorter may dispose an emptied box or container, from which he was working, onto the mechanism whereby such empty box will be conveyed to the packer, the latter withdrawing such box and using it to pack fruit into.

A further object of the invention is to provide the mechanism with not only a plurality of fruit receiving bins, but to bank or dispose said bins in such a novel manner as to reduce to a minimum the reach required both on the part of the sorter and the packer.

My invention has many other objects and features which will be more fully described in connection with the accompanying drawings and which will be more particularly pointed out in and by the appended claims.

In the drawings:—

Fig. 1, is a sectional view on line 1—1 of Fig. 2.

Fig. 3, is a sectional view on line 3—3 of Fig. 1.

Like characters of reference designate similar parts throughout the different figures of the drawings.

Figure 2:
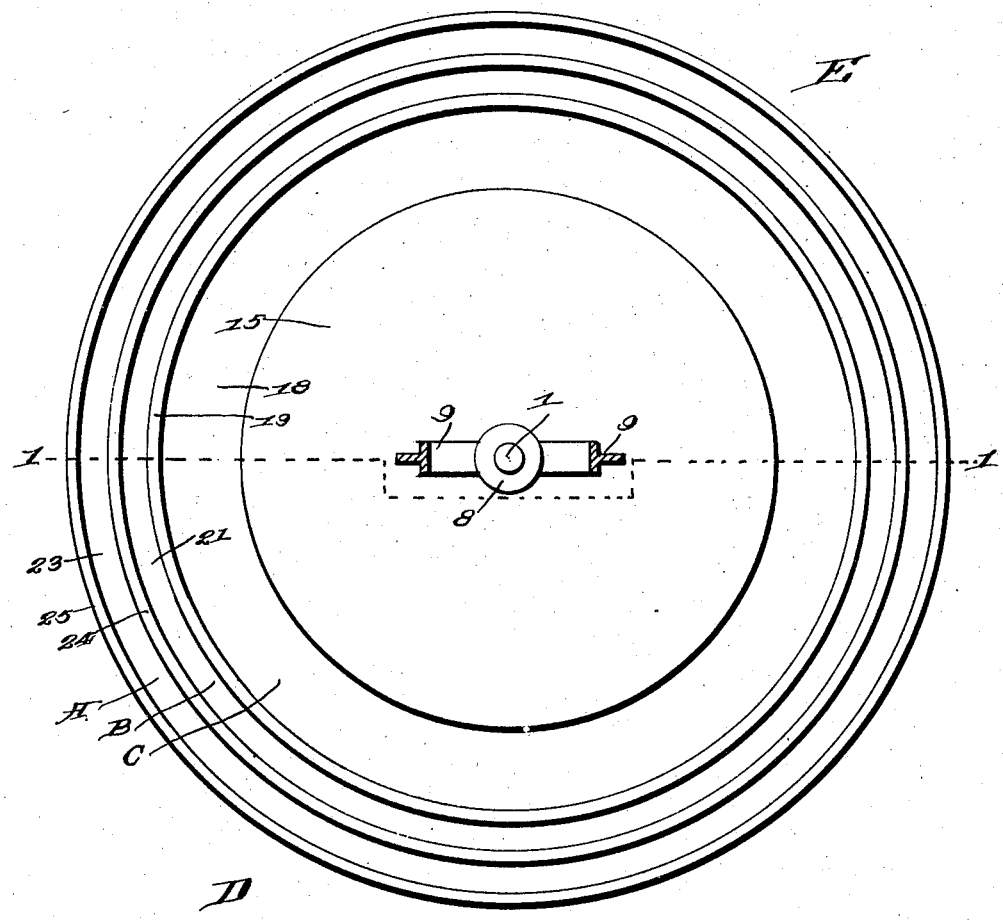
Fig. 2, is a plan view thereof.

In the specific form shown, 1 designates a combined supporting and actuating shaft which is shown reduced at 2 to form a downwardly facing shoulder 3. A step bearing 4, secured to any suitable stationary part such as the floor 5, acts as the lower bearing for said shaft. Said shaft is reduced at 6, to form an upwardly facing supporting shoulder 7, and a bearing 8, journals the upper end of said shaft. Said bearing 8 may be anchored by a bracket 9, to any convenient overhead part thereby leaving the mechanism accessible from any peripheral point. It will now be clear that shaft 1 is rotatively disposed to be driven about a substantially fixed vertical axis. I have shown a pulley 10, over which a belt 11 is trained, as one means of driving shaft 1.

I will next refer to that portion of my invention which will be broadly referred to as a bin structure.

A supporting head 12, is equipped with a boss 13, which is disposed on the reduced portion 6, and rests on shoulder 7. Means such as one or more screws 14 may be employed to non-rotatively secure head 12 to shaft 1. My improved conveying and storing structure is herein shown in the form of a circular body having a top wall 15, which is suitably mounted on and secured to head 12, by means of bolts 16. By thus mounting the structure, I insure an even horizontal movement thereof as it will be seen that the mass of the structure is distributed to afford a balanced operation. The top wall 15 has a depending vertical wall 17 from which a horizontal bin bottom wall 18, radially projects. A suitable flange 19 serves to prevent the fruit or other contents from rolling or otherwise getting off from wall 18, in a radially outward direction. A depending wall 20, extends downwardly from wall 18 and has a bin bottom wall 21. Likewise, wall 22 depends from wall 21, and has a bin bottom wall 23. Bottom walls 21 and 23, have suitable flanges 24 and 25, respectively, for a purpose similar to flange 19. Now it will be seen that I have provided three distinct bins which I will designate as A, B and C. These bins are annular bins which extend about the periphery of the bin structure and are endless.

Apple sorting and packing, to be profitable to the employer and employee, must be carried on with accuracy and speed and hence it is essential that the bins be as accessible as possible to reduce the reach of both packers and sorters to a minimum and thereby avoid extra effort as far as possible. I will therefore now explain a novel feature of my invention addressed to the solution of this problem.

It is thus a special feature to bank the bins A to C in close peripheral relation to the bin body to render the otherwise most remote bin, easily accessible. In the present form, I accomplish this desideratum by not only banking the bins in stepped relation but also in superposed and overhanging relation. The overhanging is not sufficient to interfere with free accessibility to either of the lowermost bins but the overhanging is entirely sufficient to dispose even the remote bin C, in easy reach of a sorter or packer standing close to the periphery of the structure. It will thus be seen that this problem is solved as the combined result of the stepped order and the overhang of the bins.

It will now be clear that the top of wall 15, is clear, and in practice, the bearing 8 will be high enough so as not to obstruct the top 15. Thus, the top 15 functions as a carrying or conveying platform whereupon a box or anything from the packer's or sorter's side of the mechanism may be readily conveyed to the remaining side.

In dealing with fruit, such as apples, the latter are brought loose in boxes to the sorter and the latter sorts out the apples until the box is emptied. The empty box or container, if in good condition, is re-used for packing, hence, it is a feature of my invention to provide a novel method of conveying empty boxes from the sorter to the packer without requiring either to leave his operative position.

Thus, I extend wall 23, as shown at 26, radially inwardly and provide an inner wall 27. A bottom wall 28, forms with walls 26 and 27, an annular chamber in subjacent relation to the bins. I divide this annular chamber by radially disposed partitions 29, into a plurality of box or container chambers 30, which, as will be seen, open peripherally of the bin body and are easily accessible both to the sorter for insertion of boxes, and to the packer for withdrawal of the boxes.

The operation of my device is as follows.

In practice, the bin body may be fourteen feet in diameter, more or less, in accordance with requirements and the conditions under which installation is made, and its primary use will be more often in those packing houses where the more expensive motion storage tables are either unsuitable or beyond the means of the owner. In other words, this device is primarily designed for packing houses where most of the work is done by hand.

As an example, it will be assumed that a sorter takes his stand at D, in Fig. 2, and that the packer takes his stand at E, and that the sorter will sort all three grades, putting one grade in one bin and another in another bin and so on. Now the sorter is not obligated to place the fruit in the bins in any particular manner or position, and he need not be cautious about the apples being in contact with each other as they may be in close or spaced relation. The reason why this is true that when the apples are disposed in the bins, they remain in their initial position until withdrawn and do not slide or move relatively to the bin in which they are advanced. Hence, there is no chance of injury by contact or of stem piercing. If the fruit happens to run predominately to one grade, there is ample capacity of storage should the speed of the sorter exceed that of the packer. This is due to the fact that the bins are peripherally disposed wherefore I obtain the maximum area for the bins. The capacity is such that a sorter may be employed for each grade, and if desired, a like number of packers, because the peripheral disposition of the bins provide ample room for such maximum employment of operatives.

As the packers fill their boxes, new boxes can readily be withdrawn from the chambers 30, and there are enough chambers so that an excess of boxes can be carried in order to assure a supply to the packers without delay.

It is now believed that the device of my invention will be fully understood from the foregoing description, and while I have herein shown and described one specific embodiment of my invention, I do not wish to be limited thereto except for such limitations as the claims may import.

I claim:—

1. A motion storage mechanism comprising, a circular bin body having a plurality of peripherally disposed circular bins in stepped and partially overhanging relation with respect to each other, said bins overhanging radially outwardly toward the periphery of said body.

2. As a means of excess storage and conveyance of fruit from a deposition to a withdrawal point, a circular rotary bin body of a diameter sufficient to reach from a deposition to a withdrawal point, said body having a plurality of circular fruit holding bins of a storage capacity in excess of the withdrawal capacity and each bin being adapted to hold fruit of a single grade, and means for rotating said body to convey the fruit therein from a deposition to a withdrawing point.

3. In a motion storage and conveying mechanism for fruit and the containers therefor, a motion storage bin structure having fruit storage bins and provided with container chambers, and means for actuating said structure to advance the fruit and empty containers from a sorting point to a packing point.

4. In a motion storage and conveying mechanism for fruit and empty containers therefor, a rotary storage structure having fruit bins accessible from the periphery of said structure to sorters and packers, and said structure having a series of fruit container chambers opening radially outwardly from said structure and accessible for insert therein of empty containers by sorters and withdrawal of said containers by packers, and means for rotating said structure to advance the empty containers and fruit from the sorters to the packers.

In witness that I claim the foregoing as my own, I hereby affix my signature.

EDWARD A. WHITE.